United States Patent Office 2,922,462
Patented Jan. 26, 1960

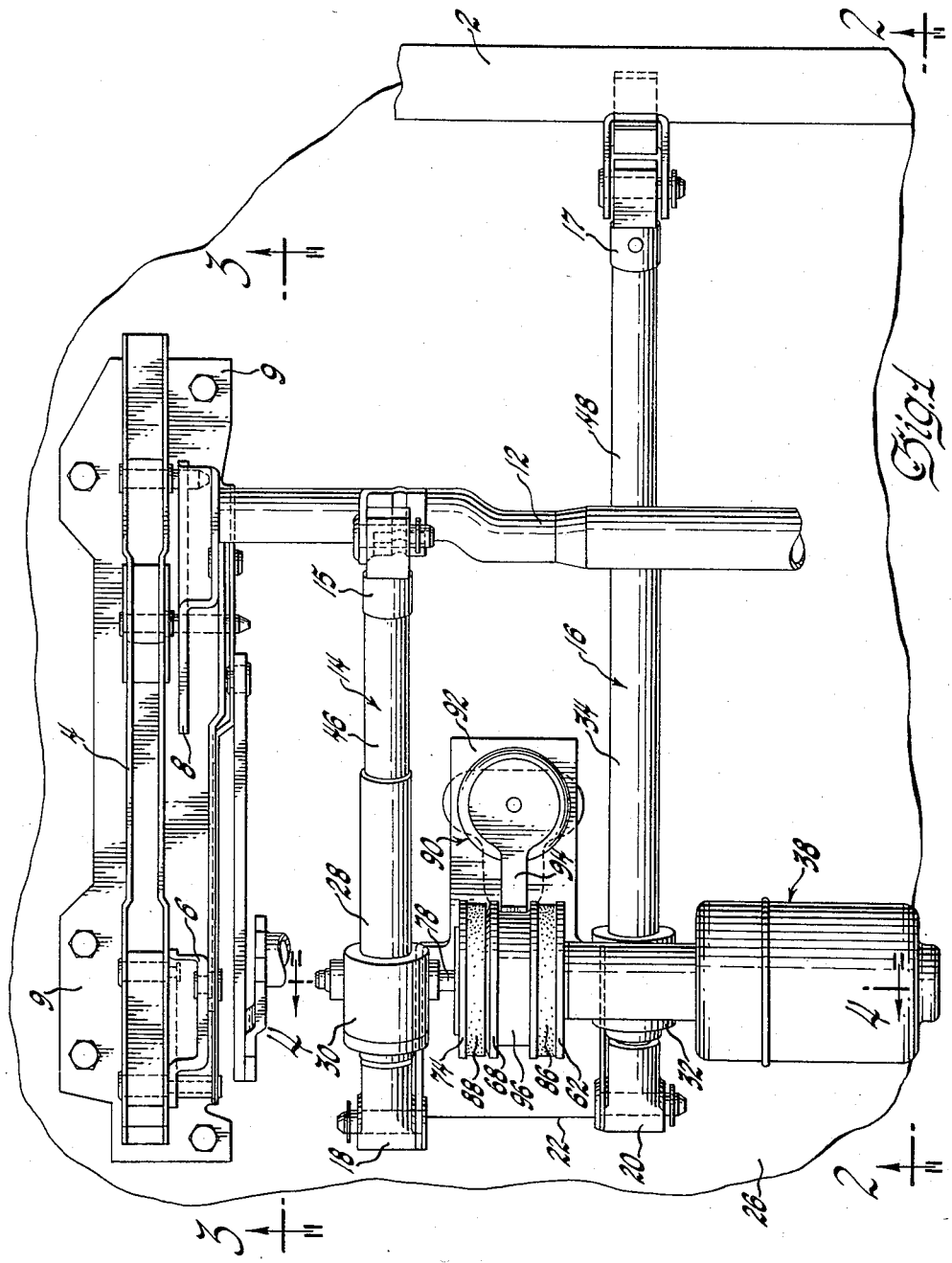

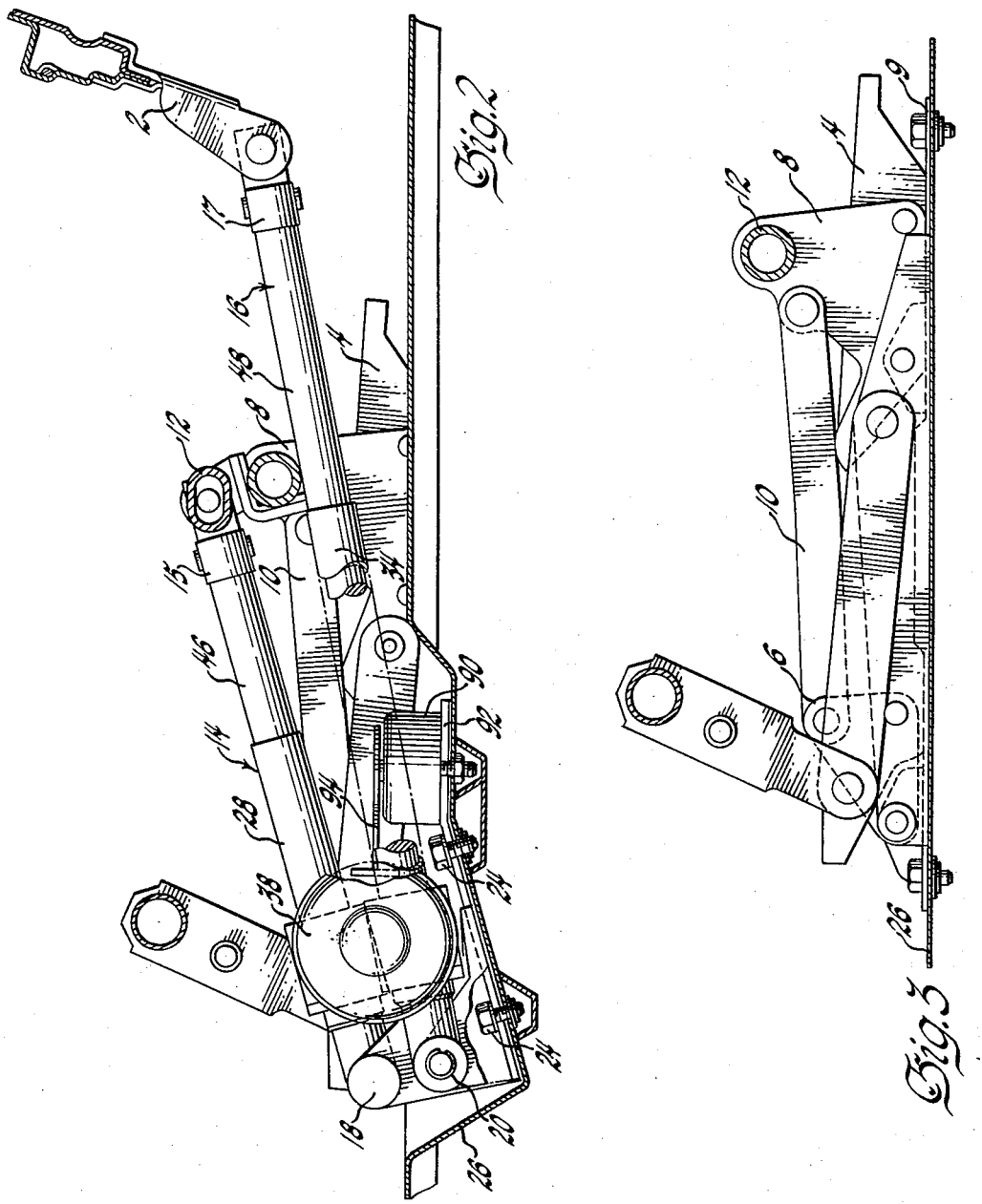

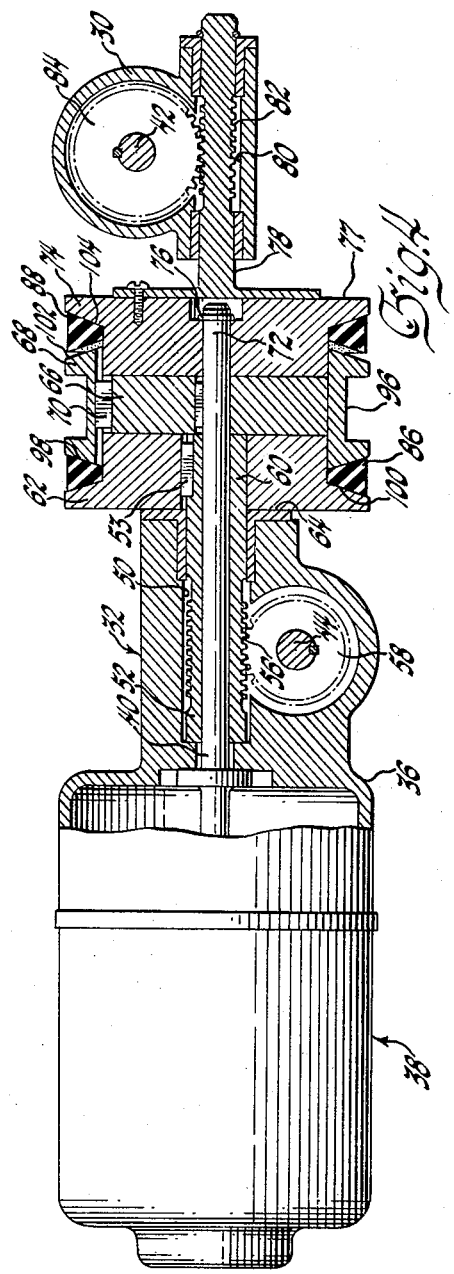

2,922,462
FOUR-WAY SEAT ACTUATOR

John Kalvaitis, Detroit, Mich., assignor to General Motors Corporation, Detroit, Mich., a corporation of Delaware Application October 5, 1955, Serial No. 538,709

8 Claims. (Cl. 155—14)

This invention relates to vehicle seats and more particularly to power operated seats adapted for movement both horizontally and vertically.

Numerous vehicle seat mechanisms have been proposed in the past which permit the occupant to adjust the seat both vertically and horizontally to obtain the most comfortable seating position. Until recently, such seats met with slight favor due to the difficulty and inconvenience of manual adjustment. However, due to the recent development of efficient and relatively inexpensive electric motor driven actuators, multiple direction seat adjusters have gained widespread acceptance. Nevertheless, in the known types of adjusters employing electric actuators, it has been the common practice to employ a separate electric motor to drive each actuator. That is, in a seat capable of fore and aft and up and down movement, one electric motor drives the vertical actuating mechanism, while a second motor drives the horizontal actuating mechanism.

An object of the present invention is to provide an improved seat adjuster mechanism.

Another object is to provide a four-way adjustable seat wherein a single power means is selectively operable to cause either fore and aft or up and down movement of the seat.

A further object is to provide a four-way seat adjuster having a first mechanism for regulating the vertical elevation of a seat and a second mechanism for regulating the longitudinal position of the seat, both of said mechanisms being selectively driven by a single means of propulsion.

Still another object is to provide in a seat of the type described an electric motor actuator which is selectively operable to drive either of two adjusting mechanisms.

Yet a further object is to provide a device of the class described which is simple in construction, low in cost and efficient in operation.

These and other objects, advantages and features of the invention will become more fully apparent as reference is had to the accompanying specification and drawings wherein:

Fig. 1 is a fragmentary plan view of the right hand portion of a vehicle seat adjusting mechanism embodying the present invention.

Fig. 2 is a side elevational view, partly in section, looking in the direction of arrows 2—2 of Fig. 1.

Fig. 3 is a side elevational view, partly in section, looking in the direction of arrows 3—3 of Fig. 1; and Fig. 4 is an enlarged rear elevational view, partly in section, showing the details of construction of the electric drive mechanism.

Referring now to the drawings and particularly Figs. 1, 2 and 3, there is illustrated the right side of a vehicle seat adjusting mechanism of the type commonly referred to as a four-way seat adjuster. Inasmuch as the present invention is not restricted in scope to any particular form of four-way seat adjuster, the description of the adjuster will be restricted to the essential features of construction and fundamental principle of operation. For a complete and detailed description of the type of seat adjuster shown in Figs. 1, 2 and 3, reference may be made to the copending application Serial No. 395,822 Garvey et al., entitled, Seat Adjuster, assigned to General Motors Corporation, now Patent No. 2,809,689. For the purposes of the present invention, it will be understood that a vehicle seat base and back structure, not shown, are disposed over and physically connected to the rear seat frame rail 2 and are movable therewith fore and aft along a path defined by longitudinally extending guide rail 4. It will also be understood that a similar guide rail, not shown, is disposed at the opposite side of the vehicle in parallel relation with rail 4. To provide up and down movement of the seat structure, rail 4 is connected to a pair of generally triangular members 6 and 8 which, in turn, are pivotally connected in longitudinally spaced relation to a supporting member 9. A longitudinally extending link 10 interconnects mmebers 6 and 8 to cause concurrent movement thereof. Thus, by rotating member 8 in a clockwise direction from the position shown in Fig. 3, rail 4 is caused to rise progressively while remaining parallel with the vehicle floor. Movement of member 8 in the direction indicated is accomplished by rotation of a transversely extending torsion rod 12, which is secured at its opposite ends to member 8 and the corresponding member, not shown, at the opposite side of the seat.

To provide power operated fore and aft and up and down movement of the seat in accordance with one feature of the invention, there are provided a pair of laterally spaced telescoping screw jack assemblies 14 and 16. The rearward end 15 of assembly 14 operatively engages torsion rod 12 and is effective to impart rotation thereto to raise or lower the seat, while the rearward end 17 of assembly 16 is connected to seat frame rail 2 and is effective to displace the seat longitudinally. Assemblies 14 and 16, respectively, are pivotally connected at their forward ends 18 and 20 to a bracket 22 which, in turn, is secured by means of bolts 24 to the vehicle floor 26. Surrounding the outer sleeve 28 of assembly 14 and disposed near the forward end thereof is a housing 30 which is arranged in transverse alignment with a similar housing 32 surrounding the outer sleeve 34 of assembly 16. Housing 32 forms an integral part of the forward end casing 36 of a reversible electric motor 38. Motor 38 is provided with an elongated drive shaft 40 which extends transversely of the axis of rotation of worm screw shafts 42 and 44. Shaft 42 is carried interiorly of telescoping sleeves 28 and 46 of assembly 14, while shaft 44 is carried interiorly of telescoping sleeves 34 and 48 of assembly 16. As seen in Fig. 4, housing 32 is provided with a bore 50 which is concentric with the axis of motor shaft 40 and offset from the axis of screw shaft 44. Disposed in bore 50 is a sleeve structure 52. Sleeve 52 surrounds motor shaft 40 and is rotatable independently thereof. At its midportion, sleeve structure 52 is provided with a worm thread 56 which operatively engages gear teeth of a gear 58 keyed to screw shaft 44. At its outer end 60, sleeve structure 52 is keyed at 53 to a driving pulley 62 which is disposed in concentric relation therewith immediately laterally adjacent the other end 64 of housing 32. Keyed near the outer end of motor shaft 40 is a driven pulley 66 which, in turn, is provided with a double flanged collar structure 68. Collar 68 is keyed at 70 to driven pulley 66 in a manner permitting lateral movement relative to pulley 66 but requiring rotary movement therewith. Rotatably supported at the outer extremity 72 of motor shaft 40 is a second driving pulley 74. Pulley 74 is identical in configuration to pulley 62 and is disposed adjacent the opposite side of driven pulley 66. A thrust ring 76 carried by shaft 40 prevents lateral outward movement of pulley 74, and thereby retains pulleys 62, 66 and 74 in assembled relation. Connected to the outer side face 77 of pulley 74 is flanged drive shaft 78 which extends through a transverse bore 80 formed in housing 30 in axial alignment with motor shaft 40. As seen in Fig. 4, the intermediate portion of drive shaft 78 is provided with worm threads 82 and is offset from the axis of rotation of screw shaft 42 of jack assembly 14. Shaft 42 has keyed thereto a gear 84, similar to gear 58, which operatively engages worm threads 82. It will now be seen that rotation of driving pulley 62 will impart rotation to screw shaft 44 in either direction and thereby either lengthen or shorten the overall length of jack assembly 16. Conversely, rotation of driving pulley 74 in either direction will impart either forward or reverse rotation to screw shaft 42 of jack assembly 14, causing lengthening or shortening thereof which, in turn, rotates torsion rod 12.

To selectively drive either pulley 62 or 74 either forwardly or rearwardly, a pair of annular resilient rings 86 and 88, respectively surround pulleys 62 and 74, respectively. Rings 86 and 88 are generally V-shaped in cross section and are adapted to occupy generally V-shaped annular grooves formed respectively by beveled shoulders on pulley 62 and one flange of collar 68, and pulley 74 and the other flange of collar 68. Since the annular V-shaped grooves are normally wider than V-shaped rings 86 and 88, motor shaft 40, driven pulley 66 and collar 68 are normally free running relative to both driving pulleys 62 and 74. In accordance with another feature of the invention, a rotary solenoid 90 is mounted on a rearwardly extending portion 92 of bracket 22. Solenoid 90 is provided with a forwardly extending finger 94, the terminal extremity of which occupies the annular groove 96 formed in collar structure 68 of driven pulley 66. Solenoid 90 is of conventional type such as shown in U.S. 2,496,880 Leland wherein the finger 94 is normally spring biased in a counterclockwise direction. Upon energization of solenoid 90, finger 94 rotates in a clockwise direction. Therefore, when solenoid 90 is unenergized, spring biased finger 94 urges collar 68 axially toward driving pulley 62, causing the beveled shoulder 98 of collar 68 to frictionally engage one side of flexible ring 86 which, in turn, frictionally engages the beveled shoulder 100 of driving pulley 62. As long as collar 66 is maintained in engagement with ring 86 by solenoid finger 94, driving pulley 62 is caused to rotate with driven pulley 66, while driving pulley 74 idles. Upon energization of solenoid 90, finger portion 94 swings clockwise and shifts collar 68 axially toward pulley 74, thus effecting clutching engagement between the beveled shoulder 102 of collar 68, flexible ring 88 and beveled shoulder 104 of pulley 74, thereby causing pulley 74 to rotate with motor shaft 40, while pulley 62 idles. In practice, fore and aft movement of the seat is controlled by energizing reversible motor 38 only, while up and down movement is controlled by energizing reversible motor 38 and solenoid 90 simultaneously.

It will now be seen that with the present invention a single electric motor may be utilized to provide propulsion for independently operable mechanisms adapted to cause up and down as well as fore and aft adjustment of a seat mechanism. By virtue of the invention, substantial reduction in the cost of a four-way seat actuating mechanism may be effected without in any way interfering with convenience, efficiency or effectiveness of operation.

While but one embodiment of the invention has been shown and described, it will be apparent that numerous changes and modifications may be made therein. It is, therefore, to be understood that it is not intended to limit the invention to the embodiment shown, but only by the scope of the claims which follow.

What is claimed is:
1. In a vehicle seat of the type adapted for both vertical and horizontal movement, a first actuator for moving said seat horizontally, a second actuator for moving said seat vertically, a motor including a power output shaft and shiftable means coaxially mounted on said motor output shaft and movable axially thereof for selectively connecting either of said actuators in driving engagement with said motor.

2. In an adjustable vehicle seat of the type adapted for both vertical and horizontal movement, a first actuator for moving said seat horizontally, a second actuator for moving said seat vertically, a reversible electric motor including an armature shaft, and shiftable means coaxially mounted on said motor armature shaft and movable axially thereof for selectively connecting either of said actuators in driving engagement with said motor.

3. In an adjustable vehicle seat of the type adapted for both vertical and horizontal movement, a pair of screw jack actuators, one for moving said seat horizontally and the other for moving said seat vertically, a reversible motor mounted on one of said actuators and including a power output shaft, driven means on said motor output shaft for movement axially thereof, driving means operatively connected to each of said actuators, and means for effecting selective engagement between said driven means and either of said driving means.

4. In combination, a pair of telescoping actuators, each actuator including a rotatable shaft, a reversible motor including a power output shaft, an axially shiftable rotatable member coaxially mounted on said motor output shaft and driven by said motor, a rotatable driving member rotatably supported by said motor output shaft at either side of said driven member and axially aligned therewith, means operatively connecting one driving member to one actuator shaft and the other driving member to the other actuator shaft, and rotary means engaging said driven member, said last mentioned means being effective to axially urge said driven member into frictional engagement with one or the other of said driving members.

5. In combination, a pair of telescoping actuators, each actuator including a rotatable shaft, a reversible motor including a power output shaft, an axially shiftable rotatable member coaxially mounted on said output shaft and driven by said motor, a rotatable driving member supported by said power output shaft at either side of said driven member and axially aligned therewith, means operatively connecting one driving member to one actuator shaft and the other driving member to the other actuator shaft, and remotely operable rotary means engaging said driven member, said last mentioned means being effective to axially urge said driven member into frictional engagement with one or the other of said driving members.

6. In combination, a pair of telescoping actuators, each actuator including a rotatable screw shaft, a reversible electric motor, a drive shaft on said motor, a driven pulley mounted on said drive shaft and axially shiftable relative thereto, a pair of rotatable driving pulleys mounted coaxially with said driven pulley, one at either side thereof, positive drive means operatively connecting one driving pulley to one screw shaft and the other driving pulley to the other screw shaft, a solenoid, and means movable by said solenoid engaging said driven pulley, said last mentioned means being effective to axially urge said driven pulley into frictional engagement with one or the other of said driving pulleys.

7. In combination, a pair of telescoping actuators, each actuator including a rotatable screw shaft, a reversible electric motor, a drive shaft on said motor, a driven pulley mounted on said drive shaft and axially shiftable relative thereto, a pair of rotatable driving pulleys mounted coaxially with said driven pulley, one at either side thereof, positive drive means operatively connecting one driving pulley to one screw shaft and the other driving pulley to the other screw shaft, a solenoid, and means movable by said solenoid engaging said driven pulley, said means being normally biased in one direction to axially urge said driven pulley into frictional engagement with one of said driving pulleys and shiftable axially in the other direction to urge said driven pulley into frictional engagement with the other of said driving pulleys responsive to energization of said solenoid.

8. In a vehicle seat of the type adapted for both horizontal and vertical movement, a first power operated actuator for moving said seat horizontally, a second power operated actuator for moving said seat vertically, a motor including a power output shaft, a pair of friction driven clutch members rotatably mounted on said shaft, means operatively connecting each of said clutch members to a respective actuator, a driving clutch member coaxially mounted on said shaft for axial movement therealong, means coupling said driving clutch member to said shaft for simultaneous rotational movement therewith, and means for selectively moving said driving clutch member into frictional engagement with either of said driven clutch members for selectively connecting either of said power operated actuators in driving engagement with said motor.

References Cited in the file of this patent
UNITED STATES PATENTS

| | | |
|---|---|---|
| 1,814,424 | Barr | July 14, 1931 |
| 1,862,759 | Morrison | July 14, 1932 |
| 2,345,182 | Corber | Mar. 28, 1944 |
| 2,349,701 | Buttikofer | May 23, 1944 |
| 2,560,465 | McVicker et al. | July 10, 1951 |
| 2,629,428 | Luketa | Feb. 24, 1953 |
| 2,630,719 | Humbert et al. | Mar. 10, 1953 |
| 2,696,403 | Baugh | Dec. 7, 1954 |
| 2,803,146 | Brundage | Aug. 20, 1957 |
| 2,809,688 | Brundage | Oct. 15, 1957 |
| 2,827,947 | Wilkinson | Mar. 25, 1958 |